US008031074B2

(12) United States Patent
Lizza

(10) Patent No.: US 8,031,074 B2
(45) Date of Patent: Oct. 4, 2011

(54) PERSONAL EMERGENCY NOTIFICATION DEVICE WITH USAGE MONITORING

(75) Inventor: Alfred M. Lizza, Oyster Bay, NY (US)

(73) Assignee: Honeywell International Inc., Morristown, NJ (US)

( * ) Notice: Subject to any disclaimer, the term of this patent is extended or adjusted under 35 U.S.C. 154(b) by 374 days.

(21) Appl. No.: 11/963,132

(22) Filed: Dec. 21, 2007

(65) Prior Publication Data

US 2009/0160643 A1 Jun. 25, 2009

(51) Int. Cl.

| | |
|---|---|
| ***G08B 23/00*** | (2006.01) |
| ***G08B 13/14*** | (2006.01) |
| ***G05B 23/02*** | (2006.01) |
| ***G11B 5/52*** | (2006.01) |

(52) U.S. Cl. ............... 340/573.1; 340/573.4; 340/573.7; 340/568.1; 340/571; 340/3.1; 369/53.3; 369/53.43

(58) Field of Classification Search ............... 340/573.1, 340/539.15, 442

See application file for complete search history.

(56) References Cited

U.S. PATENT DOCUMENTS

| | | | | |
|---|---|---|---|---|
| 6,072,392 | A * | 6/2000 | Henderson et al. | 340/539.15 |
| 2002/0075143 | A1* | 6/2002 | Foo et al. | 340/440 |
| 2004/0100376 | A1* | 5/2004 | Lye et al. | 340/539.12 |
| 2005/0206518 | A1* | 9/2005 | Welch et al. | 340/539.12 |
| 2006/0017561 | A1* | 1/2006 | Albert | 340/531 |
| 2006/0041344 | A1* | 2/2006 | Ooba | 701/29 |
| 2006/0121846 | A1* | 6/2006 | Mazar et al. | 455/7 |
| 2007/0040660 | A1* | 2/2007 | Miller et al. | 340/442 |
| 2007/0273504 | A1* | 11/2007 | Tran | 340/539.12 |
| 2008/0224852 | A1* | 9/2008 | Dicks et al. | 340/539.12 |

* cited by examiner

*Primary Examiner* — Daniel Wu
*Assistant Examiner* — Pameshanand Mahase
(74) *Attorney, Agent, or Firm* — Husch Blackwell

(57) ABSTRACT

A personal security apparatus includes a transmitting device having an event detector initiating different signals which indicate different event types. A transceiver receives the signals from the transmitting device and interprets each signal as corresponding to a particular event type. The transceiver sends respective event type alert signals to a remote monitoring device. The remote monitoring device provides a plurality of respective event type indicators for each of the event type alert signals received.

20 Claims, 1 Drawing Sheet

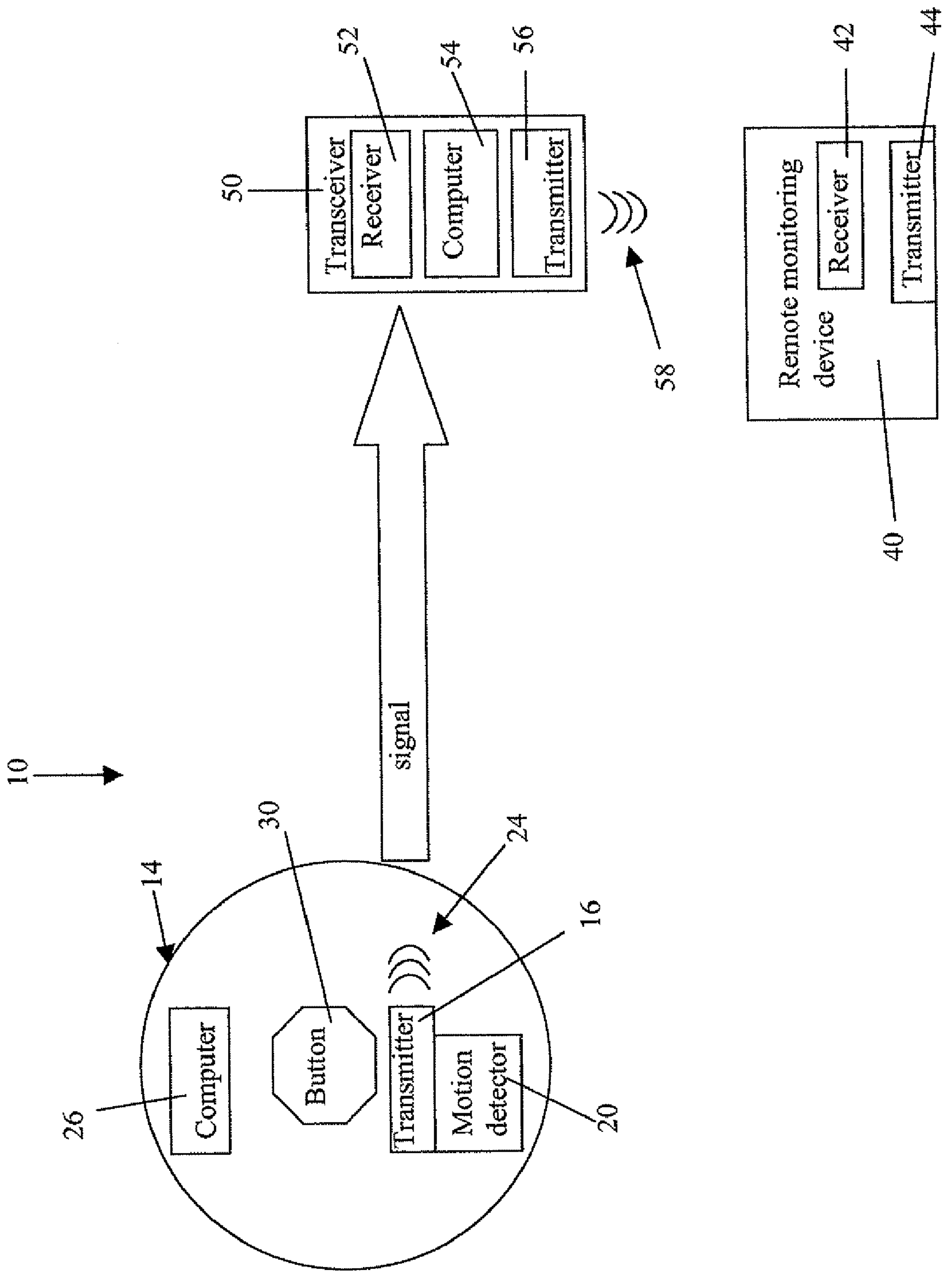
10
14
Computer
26
Button
30
Transmitter
16
Motion detector
20
24
signal
Transceiver
50
Receiver
52
Computer
54
Transmitter
56
58
Remote monitoring device
40
Receiver
42
Transmitter
44

PERSONAL EMERGENCY NOTIFICATION DEVICE WITH USAGE MONITORING

FIELD OF THE INVENTION

The present invention relates to a personal security apparatus or system, and more specifically, a personal security apparatus or system for transmitting multiple emergency or alert signals to a remote monitoring device.

BACKGROUND OF THE INVENTION

Generally, medical and other personal emergency transmitters are known in the art, and may include an emergency button for alerting a responsible party or emergency personnel of a need for assistance. However, medical and other personal emergency sensor/emergency button transmitters such as those worn around the neck, or on a wrist band used with personal emergency response systems are only effective when they are worn by the individual being monitored. If the individual forgets or deliberately chooses not to use or wear the emergency transmission device, there is no mechanism to notify the monitoring agency that the individual can not signal an emergency or for emergency assistance.

It would therefore be desirable for a monitoring agency or party to be able to receive notification or an alert that the emergency transmitter is not being worn. Further, a need exists for alerting the monitoring agency or party of various assistance situations, such as a person falling.

SUMMARY OF THE INVENTION

In an aspect of the invention, a personal security apparatus includes a transmitting device including an event detector initiating different signals wherein each of the different signals indicates a different event type, and a remote monitoring device for receiving the signals. The apparatus may further include the remote monitoring device providing a plurality of respective event indicators for each of the different signals received.

In a related aspect, a transceiver receives the signals from the transmitting device and interprets each signal as corresponding to a particular event type. The transceiver sends respective event type alert signals to the remote monitoring device. Alternatively, the event detector may be a motion detector.

In a related aspect, the event detector includes a motion detector for sensing different motion events which includes sensing a specified threshold frequency of motion and sending a particular signal indicating when the frequency of motion equals or exceeds the specified threshold frequency of motion. Further, the motion detector sends another particular signal indicating when the frequency of motion is less than the specified frequency of motion. An acceleration detector senses a specified threshold acceleration and sends another particular signal indicating when the acceleration equals or exceeds the specified threshold acceleration. The acceleration detector may further include a directional detector for determining a direction of the acceleration and sending the particular signal when both the acceleration meets the specified threshold and the direction of the acceleration is a specified direction.

In a related aspect, the event detector is a motion detector and the plurality of event types include the motion detector sensing motion, sensing no motion for a specified time period, and sensing a predefined acceleration of the transmitting device.

In a related aspect, the transmitting device includes an actuator for manually initiating a first signal, and the event detector is a motion detector which transmits a second signal indicating when the motion detector senses motion, a third signal indicating when the motion detector senses no motion for a specified time period, and a fourth signal indicating when the motion detector senses a predefined acceleration indicating a person falling.

In another aspect of the invention, a personal security system comprises a transmitting device including an event detector for initiating different signals from the transmitting device wherein each of the different signals indicates a different event type. A transceiver for receiving the signals from the transmitting device and interpreting each signal as corresponding to a particular event type, and the transceiver sending respective event type alert signals. A remote monitoring device receives the event type alert signals from the transceiver and provides a plurality of respective event type indicators for each of the event type alert signals received. Alternatively, the event detector is a motion detector. In an alternative embodiment, the event detector is a motion detector for sensing different motion events which includes sensing a specified threshold frequency of motion and sending a particular signal indicating when the frequency of motion equals or exceeds the specified threshold frequency of motion and sending another particular signal indicating when the frequency of motion is less than the specified frequency of motion. The acceleration detector includes a directional detector for determining a direction of the acceleration and sends the particular signal when both the acceleration meets the specified threshold and the direction of the acceleration is a specified direction.

In a related aspect, the event detector is a motion detector and the plurality of event types include the motion detector sensing motion, sensing no motion for a specified time period, and sensing a predefined acceleration.

In a related aspect, the transmitting device includes an actuator for manually initiating a first signal, and the event detector is a motion detector which transmits a second signal indicating when the motion detector senses motion, and a third signal indicating when the motion detector senses no motion for a specified time period, and a fourth signal indicating when the motion detector senses a predefined acceleration indicating a person falling.

In a related aspect, the transmitting device further includes a computer and program code embodied in computer readable medium read by the computer for programming criteria for at least one of the event types. In another embodiment, the transceiver includes a computer having program code embodied in computer readable medium read by the computer for interpreting the signals and corresponding the signals to the particular event type.

In a another aspect of the invention, a method for providing personal security includes: transmitting a plurality of different signals each corresponding to a different event; and receiving the signals and providing a plurality of respective event indicators for each of the different signals received. The method may further include: sensing motion; defining the motion as at least one event; and transmitting a motion signal indicating the event relating to the motion. Alternatively, the different events may include: sensing a specified threshold frequency of motion and sending a particular signal indicating when the frequency of motion equals or exceeds the specified threshold frequency of motion; and sending another particular signal indicating when the frequency of motion is less than the specified frequency of motion. The method may further include: sensing a specified threshold acceleration of motion and sending another particular signal indicating when the threshold acceleration equals or exceeds the specified threshold acceleration of motion; detecting direction of the acceleration; and sending the particular signal when both the acceleration meets the specified threshold and the direction of the acceleration is a specified direction. Alternatively, the event detector may be a motion detector, and the method may further include: activating manually a first signal from the transmitter: transmitting a second signal indicating when the motion detector senses motion; transmitting a third signal indicating when the motion detector senses no motion for a specified time period, and transmitting a fourth signal indicating when the motion detector senses a predefined acceleration indicating a person falling.

BRIEF DESCRIPTION OF THE DRAWINGS

These and other objects, features and advantages of the present invention will become apparent from the following detailed description of illustrative embodiments thereof, which is to be read in connection with the accompanying drawing, in which:

The FIGURE is a block diagram depicting a personal security apparatus or system including a transmitting device having a motion detector and a transmitter, a transceiver, and a remote monitoring derive.

DETAILED DESCRIPTION OF THE INVENTION

An illustrative embodiment of a personal security apparatus or system 10 is shown in the FIGURE and includes a transmitting device 14 having a transmitter 16 and including an event detector embodied as a motion detector 20 adapted to initiate different signals 24 sent via the transmitter 16. In alternative embodiments of the invention, the event detector may include, for example, sensors such as smoke, heat or CO detectors, or a detector for sensing noise. The transmitting device is worn or carried by a user for their personal security in the event of an emergency. The shape and size of the transmitting device and the manner of wearing the device can vary with a user's preferences, for example, the device may be worn around the neck as a pendant. Each of the different signals 24 indicates a different event type or motion category. A remote monitor 40 receives the signals 24 and provides a plurality of respective event indicators for each of the different signals 24 received from the transmitting device 14. A computer 26 or microprocessor is included in the transmitting device 14 for processing program code stored in non-transitory computer readable medium or data storage for programming criteria for event types. The remote monitoring device 40 may include, a portable device on the person of a responsible party or caretaker, or may include the 911 emergency telephone network, or a private monitoring agency.

The apparatus or system 10 further includes a base station embodied as a transceiver 50 for receiving the signals from the transmitter 14 and interpreting each signal as corresponding to a particular event type. The transceiver 50 sends respective event type alert signals to the remote monitor 40. The motion detector 20 senses different motion events which includes sensing a specified threshold frequency of motion and sending a particular signal using the transmitter 16 indicating when the frequency of motion equals or exceeds the specified threshold frequency of motion. The signal indicates that normal frequency of motion is occurring. The motion detector 20 sends another signal via the transmitter 16 indicating when the frequency of motion is less than the specified frequency of motion, thus indicating that the user is not moving or moving very little or the transmitting device is not being worn by the user.

Additionally, the motion detector 20 senses a specified threshold acceleration and sends another particular and distinct signal indicating when the acceleration equals or exceeds the specified threshold acceleration. The motion detector 20 may also include a directional detector for determining a direction of the acceleration and sending the particular signal when both the acceleration meets the specified threshold and the direction of the acceleration is a specified direction. Further, the motion detector 20 may also sense and measure distance so as to initiate a signal when a measured distance exceeds a threshold amount and acceleration exceed a threshold amount indicating the possibility that the user has fallen.

Thereby, the motion detector 20 of the transmitting device 14 includes the motion detector sensing motion, sensing no motion or a low amount of motion below a threshold value for a specified time period, and sensing a predefined acceleration of the transmitting device 14 and direction of the motion.

Further, the transmitting device 14 includes a manually activated actuator embodied as an emergency button 30. For example, the button 30, manually actuated, emits a first signal via the transmitter 16 indicating an emergency requiring emergency personnel and immediate assistance. The motion detector emits a second signal via the transmitter 16 indicating when the motion detector 20 senses motion. The motion detector 20 emits a third signal via the transmitter 16 indicating when the motion detector senses 20 no motion or low motion which is below a threshold amount for a specified time period computed by the computer 26. A fourth signal is emitted via the transmitter 24 and initiated using the motion detector 20 when the motion detector 20 senses a predefined acceleration and a specified direction of motion and also measures the distance of the acceleration indicating a person falling.

More specifically, the transceiver 50 includes a receiver 52 for receiving the signals 58, and a computer 54 for interpreting the signals 24 and corresponding the signals 24 to the particular event type. The transceiver 50 further includes a transmitter 56 for signaling 58 the remote monitor 40. The remote monitor 40 receives the signal 58 via a receiver 42. A multiplicity of signals 58 may indicate different events or the seriousness of each event. A transmitter 44 in the remote monitor 40 may send a signal to emergency personal using wired or wireless technology, and/or locally signal an emergency using a plurality of respective event indicators for each of the different signals received.

Referring to the FIGURE, in operation, the method of the present invention includes sensing motion using the motion detector 20 and defining motion meeting specified criteria as an event type using the computer 26. A signal 24 is transmitted indicating the event relating to the motion. The different events may include sensing a specified threshold frequency of motion and sending a particular signal indicating when the frequency of motion equals or exceeds the specified threshold frequency of motion. Further, an event may include sending another particular signal indicating when the frequency of motion is less than the specified frequency of motion.

Additionally, the motion detector 20 senses a specified threshold acceleration of motion and sends another particular signal indicating when the threshold acceleration equals or exceeds the specified threshold acceleration of motion. More specifically, the motion detector 20 sends the particular signal indicating when the acceleration is more than the specified threshold acceleration of motion, and a specified direction of the acceleration is sensed.

In another embodiment of the invention, the method of the invention further includes manually activating a first signal from the transmitter and transmitting a second signal indicating when the motion detector senses motion. A third signal is transmitted indicating when the motion detector senses no motion or low motion (i.e., below the threshold amount) for a specified time period, and a fourth signal is transmitted indicating when the motion detector senses a predefined acceleration and direction of motion indicating a person falling.

Thus, the transmitting device 14 is able to transmit a unique signal whenever the device experiences motion as a result of being worn, or transmits a unique signal when it has not sensed motion within a pre defined and programmable time frame. The base station or transceiver 50 can determine based upon messages sent to it by the transmitting device 14 that either the transmitting device is experiencing motion characteristics of use, and therefore likely being worn, or that the transmitter has not moved a predetermined amount of time and therefore likely not being worn. Alternatively, the transceiver 50 can determine that the motion detector 20 in the transmitting device 14 has sensed motion characteristics that indicate a potential emergency, such as acceleration indicating a fall, and direction of said acceleration. Additionally, lack of motion may be an indicator that the transmitting device 14 is not being worn, and obviously the device cannot help a person with assistance if it is not worn. The transceiver 50 can transmit signals indicating any of the above conditions to the remote monitoring device 40 and thereby alert those monitoring the device 40, which may include a responsible party or emergency personnel. Alternatively, the transceiver may initiate a call or alert signal to an existing emergency system such as the 911 emergency telephone network. Thus, in the case where a lack of motion is detected, appropriate action can be taken to alert the person or caretaker individuals that the transmitting device is not being worn.

Additionally, specifying lack of motion detected from the transmitting device 14 can include different motion criteria, such as, quantity of motion within a specified time period, as well as, a threshold amount of motion as discussed previously. Specified time periods may include a sleep time period and an awake time period, each with different threshold amounts of motion. Also, the measuring of motion may be based on the amount of time between incidences of motion, as well as, the amount of motion in a time period. Further, the transmitting device 14 may be adapted to be sensitive to simple respiratory cycles, such as the raising and lowering of a person's chest when breathing, to indicate motion and, therefore, that the person is wearing the transmitting device 14.

While the present invention has been particularly shown and described with respect to preferred embodiments thereof, it will be understood by those skilled in the art that changes in forms and details may be made without departing from the spirit and scope of the present application. It is therefore intended that the present invention not be limited to the exact forms and details described and illustrated herein, but falls within the scope of the appended claims.

What is claimed is:

1. A personal security apparatus, comprising:

a transmitting device including a transmitter and an event detector initiating different signals wherein each of the different signals indicates a different event type, said event detector further comprising an acceleration detector, a computer and program code stored in a non-transitory computer readable medium, the event detector further including a motion detector, said motion detector comprising the computer processing at least a portion of the program code, the processed program code interprets signals from the acceleration detector and detects that the transmitting device is not being worn by a user based upon a specified threshold frequency of motion and detects that the user has fallen based upon a specified threshold and direction of acceleration and wherein a first one of the different signals initiated by the event detector based upon frequency of motion sensed by the motion detector and sent by the transmitter when the frequency of motion exceeds the specified threshold is a notification that the transmitting device is not being worn by the user and a second one of the different signals initiated by the event detector based upon direction and acceleration of motion sensed by the motion detector and sent by the transmitter when the direction and acceleration of motion exceed the specified thresholds is a notification that the user has fallen; and a remote monitoring device for receiving the signals.

2. The apparatus of claim 1, wherein the remote monitoring device provides a plurality of respective event indicators for each of the different signals received.

3. The apparatus of claim 1 further including: a transceiver for receiving the signals from the transmitting device and interpreting each signal as corresponding to a particular event type, and the transceiver sending respective event type alert signals to the remote monitoring device.

4. The apparatus of claim 1, wherein the event detector is a motion detector.

5. The system of claim 1, wherein the event detector includes: a motion detector for sensing different motion events which includes sensing a specified threshold frequency of motion and sending a particular signal indicating when the frequency of motion equals or exceeds the specified threshold frequency of motion and sending another particular signal indicating when the frequency of motion is less than the specified frequency of motion; and an acceleration detector for sensing a specified threshold acceleration and sending another particular signal indicating when the acceleration equals or exceeds the specified threshold acceleration.

6. The apparatus of claim 5, wherein the acceleration detector includes a directional detector for determining a direction of the acceleration and sending the particular signal when both the acceleration meets the specified threshold and the direction of the acceleration is a specified direction.

7. The apparatus of claim 1, wherein the event detector is a motion detector and the plurality of event types include the motion detector sensing motion, sensing no motion for a specified time period, and sensing a predefined acceleration of the transmitting device.

8. The apparatus of claim 1, wherein the transmitting device includes an actuator for manually initiating a first signal, and the event detector is a motion detector which transmits: a second signal indicating when the motion detector senses motion; and a third signal indicating when the motion detector senses no motion for a specified time period, and a fourth signal indicating when the motion detector senses a predefined acceleration indicating a person falling.

9. A personal security system, comprising:

a transmitting device including an event detector for initiating different signals from the transmitting device wherein each of the different signals indicates a different event type, said event detector further comprising an acceleration device, a computer and program code stored on a non-transitory computer readable medium, said event detector including a motion detector, said motion detector comprising the computer processing at least a portion of the program code, the processed program code interprets signals from the acceleration detector and detects that the transmitting device is not being worn by a user based upon a specified threshold frequency of motion and detects that the user has fallen based upon a specified threshold and direction of acceleration and wherein a first one of the different signals based upon frequency of motion sensed by the motion detector is a notification that the transmitting device is not being worn by a user and wherein a second one of the different signals based upon direction and acceleration of motion sensed by the motion detector is a notification that the user has fallen;

a transceiver for receiving the signals from the transmitting device and interpreting each signal as corresponding to a particular event type, and the transceiver sending respective event type alert signals, wherein the first respective event type alert signal sent by the transceiver when the frequency of motion exceed the specified threshold is a notification that the transmitting device is not being worn by the user and the second respective event type alert signal sent by the transceiver when the direction and acceleration of motion exceed the specified thresholds is a notification that the user has fallen; and a remote monitoring device for receiving the event type alert signals from the transceiver and providing a plurality of respective event type indicators for each of the event type alert signals received.

10. The system of claim 9, wherein the event detector is a motion detector.

11. The system of claim 9, wherein the event detector is a motion detector for sensing different motion events which includes sensing a specified threshold frequency of motion and sending a particular signal indicating when the frequency of motion equals or exceeds the specified threshold frequency of motion and sending another particular signal indicating when the frequency of motion is less than the specified frequency of motion; and the acceleration detector includes a directional detector for determining a direction of the acceleration and sending the particular signal when both the acceleration meets the specified threshold and the direction of the acceleration is a specified direction.

12. The system of claim 9, wherein the event detector is a motion detector and the plurality of event types include the motion detector sensing motion, sensing no motion for a specified time period, and sensing a predefined acceleration.

13. The system of claim 9, wherein the transmitting device includes an actuator for manually initiating a first signal, and the event detector is a motion detector which transmits: a second signal indicating when the motion detector senses motion; and a third signal indicating when the motion detector senses no motion for a specified time period, and a fourth signal indicating when the motion detector senses a predefined acceleration indicating a person falling.

14. The apparatus of claim 9, wherein the transmitting device further includes a computer and program code embodied in non-transitory computer readable medium read by the computer for programming criteria for at least one of the event types.

15. The apparatus of claim 9, wherein the transceiver includes a computer having program code embodied in non-transitory computer readable medium read by the computer for interpreting the signals and corresponding the signals to the particular event type.

16. A method for providing personal security, comprising:

a wearable personal security device transmitting a plurality of different signals each corresponding to a different event, the wearable personal security device including a transmitter and a motion detector, said motion detector further comprising an acceleration device, a computer and program code stored on a non-transitory computer readable medium, the computer processing at least a portion of the program code, the processed program code interprets signals from the acceleration detector and detects that the transmitting device is not being worn by a user based upon a specified threshold frequency of motion and detects that the user has fallen based upon a specified threshold and direction of acceleration and wherein a first one of the plurality of different signals based upon frequency of motion sensed by the motion detector and transmitted by the transmitter when the frequency of motion exceeds the specified threshold is a notification that the personal security device is not being worn by a user and wherein a second one of the different signals based upon direction and acceleration of motion sensed by the motion detector and transmitted by the transmitter when the direction and acceleration of motion exceed the specified thresholds is a notification that the user has fallen; and a remote monitoring device receiving the signals and providing a plurality of respective event indicators for each of the different signals received.

17. The method of claim 16, further including: sensing motion; defining the motion as at least one event; and transmitting a motion signal indicating the event relating to the motion.

18. The method of claim 16, wherein the different events include: sensing a specified threshold frequency of motion and sending a particular signal indicating when the frequency of motion equals or exceeds the specified threshold frequency of motion; and sending another particular signal indicating when the frequency of motion is less than the specified frequency of motion.

19. The method of claim 18, further including: sensing a specified threshold acceleration of motion and sending another particular signal indicating when the threshold acceleration equals or exceeds the specified threshold acceleration of motion; detecting direction of the acceleration; and sending the particular signal when both the acceleration meets the specified threshold and the direction of the acceleration is a specified direction.

20. The method of claim 16, wherein the event detector is a motion detector, and the method further includes: activating manually a first signal from the transmitter: transmitting a second signal indicating when the motion detector senses motion; transmitting a third signal indicating when the motion detector senses no motion for a specified time period, and transmitting a fourth signal indicating when the motion detector senses a predefined acceleration indicating a person falling.

* * * * *